US006775657B1

(12) United States Patent
Baker

(10) Patent No.: US 6,775,657 B1
(45) Date of Patent: Aug. 10, 2004

(54) MULTILAYERED INTRUSION DETECTION SYSTEM AND METHOD

(75) Inventor: Stephen M. Baker, San Antonio, TX (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/471,508

(22) Filed: Dec. 22, 1999

(51) Int. Cl.[7] .................. G06F 17/00; H04L 9/32
(52) U.S. Cl. .................. 706/45; 713/200; 713/201; 706/50
(58) Field of Search .................. 706/46, 45, 50; 713/200, 201; 709/224, 225, 227, 238, 249

(56) References Cited

U.S. PATENT DOCUMENTS

| | | | |
|---|---|---|---|
| 5,032,979 A | 7/1991 | Hecht et al. | 713/201 |
| 5,101,402 A | 3/1992 | Chiu et al. | 709/224 |
| 5,278,901 A | 1/1994 | Shieh et al. | 713/200 |
| 5,414,833 A | 5/1995 | Hershey et al. | 713/201 |
| 5,448,724 A | 9/1995 | Hayashi | 714/4 |
| 5,488,715 A | 1/1996 | Wainwright | 714/4 |
| 5,524,238 A | 6/1996 | Miller et al. | 707/4 |
| 5,557,742 A | 9/1996 | Smaha et al. | 713/200 |
| 5,606,668 A | 2/1997 | Shwed | 713/201 |
| 5,621,889 A | 4/1997 | Lermuzeaux et al. | 713/200 |
| 5,699,513 A | 12/1997 | Feigen et al. | 713/201 |
| 5,793,763 A | 8/1998 | Mayes et al. | 370/389 |
| 5,796,942 A | 8/1998 | Esbensen | 713/201 |
| 5,798,706 A | 8/1998 | Kraemer et al. | 713/201 |
| 5,805,801 A | 9/1998 | Holloway et al. | 713/201 |
| 5,826,014 A | 10/1998 | Coley et al. | 713/201 |
| 5,905,859 A | * 5/1999 | Holloway et al. | 713/201 |
| 5,919,257 A | 7/1999 | Trostle | 713/200 |
| 5,931,946 A | 8/1999 | Terada et al. | 713/201 |
| 5,991,881 A | * 11/1999 | Conklin et al. | 713/201 |
| 6,067,585 A | * 5/2000 | Hoang | 710/11 |
| 6,131,120 A | * 10/2000 | Reid | 709/225 |

(List continued on next page.)

OTHER PUBLICATIONS

Lane et al.; "Temporal Sequence Learning and Data Reduction for Anomaly Detection". ACM Transactions on Information and System Security, Aug. 1999, vol. 2, No. 3, pp. 295–331.*

Crosbie et al.; "Defending a Computer System Using Autonomous Agents". Technical Report No. 95–022, Mar. 1994. Retrieved from the Internet on Apr. 2002, from CORA: Computer Science Research Paper Search Engine.*

Crosbie et al.; "Active Defence of a Computer System Using Autonomous Agents". Technical Report No. 95–008, Feb. 1995. Retrieved from the Internet on Apr. 2002, from CORA: Computer Research Paper Search Engine.*

Helmer et al.; "Intelligent Agents for Intrusion Detection". IEEE Information Technology Conference, Sep. 1998, pp. 121–124.*

(List continued on next page.)

Primary Examiner—Wilbert L. Starks, Jr.
Assistant Examiner—Kelvin Booker
(74) Attorney, Agent, or Firm—Baker Botts L.L.P.

(57) ABSTRACT

A multilayered intrusion detection system and method are disclosed. The method includes monitoring activity on a network and maintaining a registry of each host node address associated with a host node operable to perform host-based intrusion detection services. The method further includes comparing a destination address of the monitored network activity with at least one host node address in the registry. If an address of the network activity matches an address of a registered host node, the network activity is dismissed and allowed to proceed unencumbered to the registered host node. The network activity not destined for a registered host node has intrusion detection services performed on it. The network activity dismissed to the host node has intrusion detection services performed on it at the receiving host node.

23 Claims, 3 Drawing Sheets

U.S. PATENT DOCUMENTS

| | | | | | |
|---|---|---|---|---|---|
| 6,144,739 | A | * | 11/2000 | Witt et al. | 380/2 |
| 6,167,403 | A | * | 12/2000 | Whitmire et al. | 707/10 |
| 6,243,756 | B1 | * | 6/2001 | Whitmire et al. | 709/232 |
| 6,292,098 | B1 | * | 9/2001 | Ebata et al. | 340/506 |
| 6,298,445 | B1 | * | 10/2001 | Shostack et al. | 713/201 |
| 6,304,973 | B1 | * | 10/2001 | Williams | 713/201 |
| 6,314,409 | B2 | * | 11/2001 | Schneck et al. | 705/54 |
| 6,321,337 | B1 | * | 11/2001 | Reshef et al. | 713/201 |
| 6,321,338 | B1 | * | 11/2001 | Porras et al. | 713/201 |
| 6,324,656 | B1 | * | 11/2001 | Gleichauf et al. | 714/37 |
| 6,347,374 | B1 | * | 2/2002 | Drake et al. | 713/200 |
| 6,385,724 | B1 | * | 5/2002 | Beckman et al. | 713/167 |
| 6,405,318 | B1 | * | 6/2002 | Rowland | 713/200 |
| 6,484,203 | B1 | * | 11/2002 | Porras et al. | 709/224 |
| 6,487,665 | B1 | * | 11/2002 | Andrews et al. | 713/201 |
| 6,507,908 | B1 | * | 1/2003 | Caronni | 713/153 |
| 6,542,993 | B1 | * | 4/2003 | Erfani | 713/201 |
| 6,574,736 | B1 | * | 6/2003 | Andrews | 713/201 |
| 6,574,737 | B1 | * | 6/2003 | Kingsford et al. | 713/201 |
| 6,578,147 | B1 | * | 6/2003 | Shanklin et al. | 713/200 |
| 6,584,508 | B1 | * | 6/2003 | Epstein et al. | 709/229 |
| 6,584,565 | B1 | * | 6/2003 | Zamek | 713/156 |
| 6,597,957 | B1 | * | 7/2003 | Beakley | 700/7 |
| 6,611,869 | B1 | * | 8/2003 | Eschelbeck et al. | 709/228 |
| 6,678,734 | B1 | * | 1/2004 | Haatainen et al. | 709/230 |

OTHER PUBLICATIONS

Balasubramaniyan et al.; "An Architecture for Intrusion Detection Using Autonomous Agents". Proceedings of the $14^{th}$ Annual Computer Security Applications Conference, Dec. 1998, pp. 13–24.*

Maloof et al.; "A Method for Partial–Memory Incremental Learning and its Application to Computer Intrusion Detection". Proceedings of the $7^{th}$ International Conference on Tools with Artificial Intelligence, Nov. 1995, pp. 392–397.*

Barrus et al.; "A Distributed Autonomous–Agent Network–Intrusion Detection and Response System". NEC Research Index, Procedings of the 1998 Command and Control Research and Technology Symposium, Jun. 1998.*

Internet Security Systems; "Network vs. Host—Based Intrusion Detection; A Guide to Intrusion Detection Technology". Internet Security Systems whitepaper, Oct. 1998. Retrieved online on May 2002. Obtained from the Internet: www.iss.net/support/documentation.*

Neumann et al.; "Experience with EMERALD to DATE". $1^{st}$ USENIX Workshop on Intrusion Detection and Network Monitoring, Apr. 1999, pp. 73–80.*

Ilgun et al.; "State Transition Analysis: A Rule–Based Intrusion Detection Approach". IEEE Transactions on Software Engineering, Mar. 1995, vol. 21, No. 3.*

Sekar et al.; "A High–Performance Network Intrusion Detection System". Proceedings of the $6^{th}$ ACM Conference on Computer and Communications Security, Aug. 1999, pp. 8–17.*

Yau et al., Computer Network Intrusion Detection, Assessment and Prevention Based on Security Dependency Relation, Proceedings of the 23rd International Computer Software and Applications Conference, Oct. 1999, pp. 86–91.*

Snapp et al., A System for Distributed Intrusion Detection, Digest of Papers, Compcon Spring '91, Mar. 1991, pp. 170–176.*

White et al., Problems with DCE Security Services, ACM SIGCOMM Computer Communication Review, Oct. 1995, p. 12.*

Lane et al., Temporal Sequence Learning and Data Reduction for Anomaly Detection, ACM Transactions on Information and System Security, Aug. 1999, vol. 2, No. 3, pp. 295–331.*

Lee et al., Data Mining Approaches for Intrusion Detection, Proceedings of the 7th USENIX Security Symposium, Jan. 1999.*

Network Computing, Intrusion Detection, Take Two, Nov. 1999, Retrieved from the Internet: http://www.nwc.com/1023/1023fl.html?Is=NCJS10.*

Internet Security Systems, Windows NT 4.0 Security Configuration: Locking Down a Windows NT Host for Intrusion Detection, Aug. 1998, Retrieved from the Internet: http://www.iss.net.*

ICSA Intrusion Detection Systems Consortium, An Introduction to Intrusion Detection and Assessment, Spring 1999, Retrieved from the Internet: http://www.icsalabs.com/html/communities/ids/whitepaper.*

Stillerman et al., "Intrusion Detection for Distributed Applications", Communications of the ACM, Jul. 1999, vol. 42, No. 7, pp. 62–69.*

Durst et al., "Testing and Evaluating Computer Intrusion Detection Systems", Communications of the ACM, Jul. 1999, vol. 42, No. 7, pp. 53–61.*

Bonifacio, Jr., et al., "Neural Networks in Intrusion Detection Systems", The 1998 IEEE International Joint Conference on Neural Networks, vol. 1, May 1998, pp. 205–210.*

Maloof et al., "A Method for Partial–Memory Incremental Learning and Its Application to Computer Intrusion Detection", Proceedings of the 7th International Conference on Tools and Al, Nov. 1995, pp. 392–397.*

Bace et al., "Intrusion Detection Systems", Macmillan Technical Publishing, 2000.*

Moghe et al., "RAP–Rate Adaptive Polling for Network Management Applications", IEEE Network Operations and Management Symposium, Feb. 1998, vol. 2, pp. 395–399.*

Balasubramaniyan et al., "An Architecture for Intrusion Detection Using Autonomous Agents", Proceedings of the 14th Annual Computer Security Applications Conference, Dec. 1998, pp. 13–24.*

Kim et al., "Study of Security Management System Based on Client/Server Model", 1999 IEEE International Conference on Communications, Jun. 1999, vol. 2, pp. 1403–1408.*

"Preliminary Report on Advanced Security Audit Trail Analysis on UNIX," N. Habra et al., pp. 1–34 (found at http://www.cs.purdue.edu/coast/archive/data/categ24.html), Sep. 1994.

"IDIOT–Users Guide," M. Crosbie, et al., pp. 1–63, (found at http://www.cs.purdue.edu/coast/archive/data/categ24.html), Sep. 1996.

"An Introduction to Intrusion Detection," A. Sundaram, pp. 1–10, (found at http://www.cs.purdue.edu/coast/archive/data/categ24.html), 1996.

"Use of A Taxonomy of Security Faults," T. Aslam, et al., pp. 1–10, (found at http://www.cs.purdue.edu/coast/archive/data/categ24.html), Sep. 1996.

"Artificial Intelligence and Intrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A. Mounji, (found at http://www.cs.purdue.edu/coast/archive/data/categ24.html), Dec. 21, 1999.

"GrIDS–A Graph Based Intrusion Detection System For Large Networks," S. Staniford–Chen, et al., 10 pages, (found at http://www.cs.purdue.edu/coast/archive/data/categ24.html), Dec. 21, 1999.

"A Pattern Matching Model For Misuse Intrusion Detection," S. Kumar, et al., pp. 1–11, (found at http://www.cs.purdue.edu/coast/archive/data/categ24.html), Jun. 1994.

"An Application of Pattern Matching in Intrusion Detection", S. Kumar, et al., pp. 1–55, (found at http://www.cs.purdue.edu/coast/archive/data/categ24.html), Jun. 1994.

"A Software Architecture to Support Misuse Intrusion Detection", S. Kumar, et al., pp. 1–17, (found at http://www.cs.purdue.edu/coast/archive/data/categ24.html), Mar. 1995.

"Applying Genetic Programming to Intrusion Detection", M. Crosbie, et al., pp. 1–8, (found at http://www.cs.purdue.edu/coast/archive/data/categ24.html), Dec. 21, 1999.

"Defending a Computer System Using Autonomous Agents", M. Crosbie, et al., pp. 1–11, (found at http://www.cs.purdue.edu/coast/archive/data/categ24.html), Mar. 1994.

"Analysis Of An Algorithm For Distributed Recognition And Accountability", C. Ko, et al., pp. 1–11, (found at http://www.cs.purdue.edu/coast/archive/data/categ24.html), Dec. 21, 1999.

"A Standard Audit Trail Format", Matt Bishop, *Proc. of the 1995 NISSC*, Baltimore, MD., (found at http://seclab.cs.ucdavis.edu/papers.html), 1995.

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.htm.), Feb. 1985.

"The Architecture and Implementation of Network–Layer Security Under Unix", J. Ionnidis, et al., 11 pages, (found at http://www.cs.purdue.edu/coast/archive/data/categ30.html), Dec. 21, 1999.

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue.edu/coast/archive/data/categ30.html), Oct. 1990.

"NFS Tracing By Passive Network Monitoring", Matt Blaze, 11 pages, (found at http://www.cs.purdue/edu/coast/archive/data/categ30.html), Dec. 21, 1999.

"Pseudo–Network Drivers and Virtual Networks", S.M. Bellovin, 15 pages, (found at http://www.cs.purdue/edu/coast/archive/data/categ30.html), Dec. 21, 1999.

Masters Thesis entitled "Addressing Weaknesses In The Domain Name System Protocol", Purdue University, Christoph Schuba, pp. 1–87., (found at http://www.cs.purdue.edu/coast/archive/data/categ30.html), Aug. 1993.

"Countering Abuse of Name–Based Authentication", C.L. Schuba, et al., pp. 1–21., (found at http://www.cs.purdue.edu/coast/archive/data/categ30.html), Dec. 21, 1999.

"The 'Session Tty' Manager", S.M. Bellovin, pp. 1–16., (found at http://www.cs.purdue.edu/coast/archive/data/categ30.html), Dec. 21, 1999.

"Secure RPC Authentication (SRA) for TELNET and FTP", D.R. Safford, et al., pp. 1–5, (found at http://www.cs.purdue.edu/coast/archive/data/categ30.html), 1993.

"A Reliable and Secure UNIX Connection Service", D. Draheim, et al., pp. 1–12, (found at http://www.cs.purdue.edu/coast/archive/data/categ30.html), Dec. 21, 1999.

"TCP Wrapper Network Monitoring, Access Control, and Booby Traps", Wietse Venema, 8 pages., (found at http://www.cs.purdue.edu/coast/archive/data/categ30.html), Dec. 21, 1999.

"Characteristics of Wide–Area TCP/IP Conversations", R. Cáceres, et al., pp. 1–12, (found at http://www.cs.purdue.edu/coast/archive/data/categ30.html), 1991.

"A Unix Network Protocol Security Study: Network Information Service", D.K. Hess, et al., 5 pages, (found at http://www.cs.pudue.edu/coast/archive/data/categ30.html), Dec. 21, 1999.

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., *Proc. of the 14th National Computer Security Conference*, Oct. 1991, pp. 362–371., (found at http://seclab.cs.ucdavis.edu/papers.html.), 1991.

"Internetwork Security Monitor: An Intrusion–Detection System for Large–Scale Networks", L.T. Heberlein et al., *Proc. of the 15th National Computer Security Conference*, Oct. 1992, pp. 262–271, 1992.

"Comparison Between Internet Security Scanner (ISS) 1.x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection System, S. Cheung et al., *U.C. Davis Computer Science Department Technical Report SCE–99–2*, 1999, pp. 1–47, (found at http://seclab.cs.ucdavis.edu/papers.html.), Jan. 26, 1999.

"Luby–Rackoff Backwards: Increasing Security of Making Block Ciphers Non–Invertible", M. Bellare, et al., *Advances in Cryptology–Eurocrypt 98 Proceedings, Lecture Notes in Computer Science*, vol. 1403 Springer–Verlat (1998) pp. 1–27, (found at http://seclab.cs.ucdavis.edu/papers.html.), Oct. 17, 1998.

"Detecting Disruptive Routers: A Distributed Network Monitoring Approach", K.A. Bradley, et al, *Proceedings of the 1998 IEEE Symposium on Security and Privacy*, Oakland, CA, pp. 115–124 (found at http://seclab.cs.ucdavis.edu/papers.html.), May 1998.

"Stack and Queue Integrity on Hostile Platforms", P.T. Devanbu, et al., *IEEE Symposium on Security and Privacy*, Oakland CA, (found at http://seclab.cs.ucdavis.edu/papers.html.), 1998.

"Techniques for Trusted Software Engineering", P.T. Devanbu et al., *Proceedings of the 20th International Conference on Software Engineering*, Kyoto, Japan, (found at http://seclab.cs.ucdavis.edu/papers.html.), 1998.

"Data Level Inference Detection in Database Systems", R.W. Yip et al., *Proceedings of the 11th IEEE Computer Security Foundations Workshop*, Rockport, Massachusetts, (found at http://seclab.cs.ucdavis.edu/papers.html.), 1998.

"The Design and Implementation of a Data Level Database Inference Detection System", Yip et al., *Proceedings of the Twelfth Annual IFIP WG 11.3 Working conference on Database Security*, Chalkidki, Greece 14 pages, (found at http://seclab.cs.ucdavis.edu/papers.html.), 1998.

"Theft of Information in the Take–Grant Protection Model", Matt Bishop, 35 pages, *Journal of Computer Security* 4(4)(1996), (found at http://seclab.cs.ucdavis.edu/papers.html.) Mar. 13, 1997.

"Information Survivability, Security, and Fault Tolerance", Matt Bishop, position paper for the Information Survivability Workshop *Journal of Computer Security #6*) 1 page, (found at http://seclab.cs.ucdavis.edu/papers.html), 1997.

"Teaching Computer Security", Matt Bishop, position paper for the *Workshop on Education in Computer Security*, Monterey CA, 3 pages, (found at http://seclab.cs.ucdavis.edu/papers.html.), 1997.

"Protecting Routing Infrastructures from Denial of Service Using Cooperative Intrusion Detection", S. Cheung et al., *Proc. new Security Paradigms Workshop*, Cumbria, UK 13 pages, (found at http://seclab.cs.ucdavis.edu/papers.html.), 1997.

"An Efficient Message Authentication Scheme for Link State Routing", S. Cheung, *Proc. 13th annual Computer Security Applications Conference*, San Diego, CA, 9 pages, (found at http://seclab.cs.ucdavis.edu/papers.html.), 1997.

"Cryptographic Verification of Test Coverage Claims", P. Devanbu et al., *Proceedings, Fifth ACM/SIGSOFT Conference on Foundations of Software Engineering*, Zurich, Switzerland) (found at http://seclab.cs.ucdavis.edu/papers.html.), 1997.

"Property–Based Testing; A New Approach to Testing for Assurance", Fink et al., *ACM SIGSOFT Software Engineering Notes*, 22(4), (found at http://seclab.cs.ucdavis.edu/papers.html.), 1997.

"Checking for Race Conditions in File Accesses", Bishop et al., *Computing Systems 9(2).*, (found at http://seclab.cs.ucdavis.edu/papers.html.), 1996.

"An Isolated Network for Research", Bishop et al., *The 19th NISSC*, pp. 1–9, (found at http://seclab.cs.ucdavis.edu/papers.html.), 1996.

"Goal–Oriented Auditing and Logging", Bishop et al., submitted to IEEE Transactions on Computing Systems, (found at http://seclab.cs.ucdavis.edu/papers.html.), 1996.

"Extending The Take–Grant Protection System", J. Frank et al., The IEEE Oakland Conference on Research in Security and Privacy., (found at http://seclab.cs.ucdavis.edu/papers.html.), Dec. 5, 1996.

Network Security Via Reverse Engineering of TCP Code: Vulnerability Analysis and Proposed Solutions, Guha et al., *Proc. of the IEEE Infocom '96*, San Francisco, CA (found at http://seclab.cs.ucdavis.edu/papers.html), 1996.

"Attack Class: Address Spoofing", Heberlein et al., The 19th National Information Systems Security Conference, (found at http://seclab.cs.ucdavis.edu/papers.html), 1996.

PhD. Theses entitled Execution Monitoring Of Security–Critical Programs In A Distributed System: A Specification–Based Approach, Calvin Cheuk Wang Ko, 111 pages, (found at http://seclab.cs.ucdavis.edu/papers.html), 1996.

"A Methodology for Testing Intrusion Detection Systems", Puketza et al., *IEEE Transactions on Software Engineering*, vol. 22, No. 10, (found at http://seclab.cs.ucdavis.edu/papers.html), 1996.

"The Exact Security of Digital Signatures–How to Sign with RSA and Rabin", Bellare et al. Earlier version appears in *Advances in Crytology—Eurocrypt '96*, LNCS vol. 1070, U. Maurer ed., Springer–Verlag, pp. 399–416), (found at http://seclab.cs.ucdavis.edu/papers.html), 1996.

"How to Protect DES Against Exhaustive Key Search", Kilian et al., Advances in Cryptology—CRYPTO'96., (found at http://seclab.cs.ucdavis.edu/papers.html), 1996.

"GrIDS–A Graph Based Intrusion Detection System For Large Networks", Staniford–Chen et al., *The 19th NISSC*. 10 pages, (found at http://seclab.cs.ucdavis.edu/papers.html), 1996.

"NetKuang–A Multi–Host Configuration Vulnerability Checker", Zerkle et al., *Proc. of the 6th USENIX Security Symposium*, San Jose, CA., (found at http://seclab.cs.ucdavis.edu/papers.html), 1996.

Abstract entitled Theft of Information in the Take–Grant Protection Model, Matt Bishop, *Journal of Computer Security, vol. 3, No. 4*, (found at http://seclab.cs.ucdavis.edu/papers.html), 1995.

"Improving System Security via Proactive Password Checking", Matt Bishop,*Computers & Security*, vol. 14, No. 3, pp. 233–249, (found at http://seclab.cs.ucdavis.edu/papers.html), 1995.

"Simulating Concurrent Intrusions for Testing Intrusion Detection Systems: Parallelizing Intrustions", Chung et al., *Proc. of the 1995 NISSC*, Baltimore, MD, 11 pages, (found at http://seclab.cs.ucdavis.edu/papers.html), 1995.

"Network Security Monitor", L. Todd Heberlein, *Lawrence Livermore National Laboratory project deliverable*, (found at http://seclab.cs.ucdavis.edu/papers.html), 1995.

"Audit Log Analysis Using the Visual Audit Browser Toolkit", Hoagland et al., *U.C. Davis Computer Science Department Technical Report CSE–95–11*, (found at http://seclab.cs.ucdavis.edu/papers.html), 1995.

"MCF: A Malicious Code Filter", R.W. Lo et al., *Computers & Security*, (1995) vol. 14, No. 6. (27 pages.), (found at http://seclab.cs.ucdavis.edu/papers.html), 1995.

"Bucket Hashing and its Application to Fast Message Authentication", Phillip Rogaway, *Acvances in Crytology—CRYPTO '95*, (found at http://seclab.cs.ucdavis.edu/papers.html), 1995.

"Provably Secure Session Key Distribution–The Three Party Case", Bellare et al., *Proc. of the 27th Annual ACM Symposium on Theory of Computing*, Las Vegas, NV, (found at http://seclab.cs.ucdavis.edu/papers.html), 1995.

"XOR MACs: New Methods for Message Authentication Using Finite Pseudorandom Functions", Bellare et al.,*Advances in Cryptology—CRYPTO '95*, (found at http://seclab.cs.ucdavis.edu/papers.html), Oct. 1995.

"Holding Intruders Accountable on the Internet", Staniford–Chen et al., *Proc. of the 1995 IEEE Symposium on Security and Privacy*, Oakland, CA, (11 pages) (found at http://seclab.cs.ucdavis.edu/papers.html), 1995.

"LAFS: A Logging and Auditing File System", Christopher Wee, *Proc. of the 11th Computer Security Applications Conference*, 10 pages, (found at http://seclab.cs.ucdavis.edu/papers.html), 1995.

"Towards a Property–based Testing Environment with Applications to Security–Critical Software", Fink et al., *Proc. of the 4th irvine Software Symposium*. 10 pages, (found at http://seclab.cs.ucdavis.edu/papers.html), 1994.

"Property–based Testing of Privileged Programs", Fink et al., *Proc. of the 10th Annual Computer Security Applications Conference*, Orlando, FL. 10 pages, (found at http://seclab.cs.ucdavis.edu/papers.html), Dec. 1994.

"Artificial Intelligence and Intrusion Detection: Current and Future Directions", Jeremy Frank,*Proc. of the 17th National Computer Security Conference*. 12 pages, (found at http://seclab.cs.ucdavis.edu/papers.html).

"Automated Detection of Vulnerabilities in Privileged Programs by Execution Monitoring", Ko et al.,*Proc. of the 10th Annual Computer Security Applications Conference*, Orlando, FL. (found at http://seclab.cs.ucdavis.edu/papers.html), 1994.

"Common Techniques in Fault–Tolerance and Security", Levitt et al., *Proc. of the Dependable Computing for Critical Applications 4*, San Diego, CA. 4 pages, (found at http://seclab.cs.updavis.edu/papers.html), 1994.

"Network Intrusion Detection", Mukherjee et al., *IEEE Network*, May–June 1994, vol. 8, No. 3, pp. 26–41. (found at http://seclab.cs.ucdavis.edu/papers.html), 1994.

"A New Suggestion for How to Encrypt with RSA", Bellare et al., *Eurocrypt '94*, 20 pages, (found at http://seclab.cs.ucdavis.edu/papers.html), 1994.

"The Security of Cipher Block Chaining", Bellare et al., *Advances in Cryptology—CRYPTO '94*, Santa Barbara CA. (19 pages.) (found at http://seclab.cs.ucdavis.edu/papers.html), 1994.

"Analysis Of An Algorithm For Distributed Recognition And Accountability", Ko et al., *Proc. 1st ACM Conference on Computer and Communication Security*. Fairfax, VA, Nov. 1993, 11 pages, (found at http://seclab.cs.ucdavis.edu/papers.html), 1993.

"Entity Authentication and Key Distribution". Bellare et al., *Advances in Cryptology—Crypto '93*, Santa Barbara, CA, Aug. 1993, pp. 232–249. (found at http://seclab.cs.ucdavis.edu/papers.html), Aug. 1993.

"Random Oracles are Practical: A Paradigm for Designing Efficient Protocols", Bellare et al., *Proc. of the 1st ACM Conference on Computer and Communication Security*, Fairfax, VA, Nov. 1993, pp. 1545–164. (found at http://seclab.cs.ucdavis.edu/papers.html), 1993.

"A Software–Optimized Encryption Algorithm", Rogaway et al., *Proc. of the Fast Software Encryption Cambridge Security Workshop*, Cambridge, UK (16 pages.) (found at http://seclab.cs.ucdavis.edu/papers.html), 1993.

"Anatomy of a Proactive Password Changer", Matt Bishop, *Proc. of the UNIX Security Symposium III* Baltimore, MD, 15 pages. (found at http://seclab.cs.ucdavis.edu/papers.html), 1992.

DIDS (Distributed Intrusion Detection System)– Motivation, Architecture, and An Early Prototype, Snapp et al., *Proc. 14th National Computer Security Conference*, Washington, DC (9 pages.) (found at http://seclab.cs.ucdavis.edu/papers.html), 1991.

"Proactive Password Checking", Matt Bishop, *Proc. of the 7th International Conference on Information Security*, May 1991, pp. 169–181. (found at http://seclab.cs.ucdavis.edu/papers.html), 1991.

Dissertation entitled Issue in Debugging Sequential and Concurrent Programs: Methods, Techniques, and Implementation, University of California, Wingshun Wilson Ho, 191 pages. (found at http://seclab.cs.ucdavis.edu/papers.html), 1992.

Abstract entitled "Collaboration Using Roles" by M. Bishop, *Software—Practice and Experience*, vol. 20, No. 5, May 1990. (found at http://seclab.cs.ucdavis.edu/papers.html), May 1990.

Abstract entitled "An Extendable Password Checker" by M. Bishop, *Proc. UNIX Security II* Portland, OR, Aug. 27–28 1990, pp. 15–16, (found at http://seclab.cs.ucdavis.edu/papers.html), 1990.

Abstract entitled "A Security Analysis of the NTP Protocol Version 2" by M. Bishop, Dec. 1990.

Abstract entitled "A Little Knowledge Goes a Long Way: Faster Detection of Compromised Data in 2–D Tables" by D. Gusfield,*Proc. of the 1990 IEEE Symposium on Research in Security and Privacy*, Oalkland, CA. May 7–9, 1990, pp. 86–94, (found at http://seclab.cs.ucdavis.edu/papers.html), May 1990.

Abstract entitled "A Network Security Monitor" by L.T. Heberlein, G.V. Dias, K.N. Levitt, B. Mukherjee, and others, *Proc. of the 1990 IEEE Symposium on Research in Security and Privacy*, Oakland, CA, May 7–9, 1990, pp. 296–304, (found at http://seclab.cs.ucdavis.edu/papers.html), May 1990.

Abstract entitled "Static Analysis Virus Detection Tools for UNIX Systems" by P. Kerchen, et al., *Proc. 13th National Computer Security Conference*, Washington, DC, Oct. 1–4, 1990, pp. 350–365, (found at http://seclab.cs.ucdavis.edu/papers.html), Oct. 1994.

Abstract entitled "Security with Low Communication Overhead" by D. Beaver, et al., *Proc. Advances in Cryptology–CRYPTO '90*, Santa Barbara, CA, Aug. 11–15, 1990, pp. 62–76, (found at http://seclab.cs.ucdavis.edu/papers.html), Aug. 1990.

Abstract entitled "The Round Complexity of Secure Protocols" by D. Beaver, et al., *Proc. of the 22nd Annual ACM Symposium on Theory of Computing*, Baltimore, MD, May 14–16, 1990, pp. 503–513. (found at http://seclab.cs.ucdavis.edu/papers.html), May 1990.

Abstract entitled "PACLs: An Access Control List Approach to Anti–Viral Security" by D.R. Wichers, et al., *Proc. 13th National Computer Security Conference*, Washington, DC, Oct. 1–4, 1990, pp. 340–349. (found at http://seclab.cs.ucdavis.edu/papers.html), Oct. 1990.

Abstract entitled "Verification of Secure Distributed Systems in Higher Order Logic: A Modular Approach Using Generic Components" by J. Alves–Foss, K. Levitt, *Proc. of the 1991 IEEE Computer Society Symposium on Research in Security and Privacy*, Oakland CA May 20–22, 1991, pp. 122–135. (found at http://seclab.cs.ucdavis.edu/papers.html), May 1991.

Abstract entitled "An Authentication Mechanism for USENET" by M. Bishop, *Proc. of the Winter 1991 USENIX Conference*. Jan. 21–25, 1991, pp. 281–287, (found at http://seclab.cs.ucdavis.edu/papers.html), Jan. 1991.

Abstract entitled "Password Management" by M. Bishop, *Compcon Spring '91. Digest of Papers*. San Francisco, CA, Feb. 25–Mar. 1, 1991, pp. 167–169. (found at http://seclab.cs.ucdavis.edu/papers.html), Mar. 1991.

Abstract entitled "Teaching Computer Security" by M. Bishop, May 1993.

Abstract entitled "Recent Changes to Privacy Enhanced Election Mail" by M. Bishop, *Journal of Internetworking: Research and Experience*. vol. 4, No. 1, Mar. 1993, pp. 47–59. (found at http://seclab.cs.ucdavis.edu/papers.html), Mar. 1993.

Abstract entitled "A Modified Random Perturbation Method for Database Security" by P. Tendick, N. Matloff, *ACM Transactions on Database Systems*, Mar. 1994, vol. 19, No. 1, pp. 47–63, (found at http://seclab.cs.ucdavis.edu/papers.html), Mar. 1994.

Short presentation entitled "Intrusion Detection for network infrastructures" by S. Cheung, K.N. Levitt, C. Ko. *The 1995 IEEE Symposium on Security and Privacy*, Oakland CA, May 1995.

Master Thesis entitled "Paradigms for the Reduction of Audit Trails" by B. Wetmore, downloaded from http://seclab.cs.ucdavis.edu/papers.html, 1993.

"Open System Security —an Architectural Framework" by Arto T. Karila, (found at http://www.cs.purdue.edu/coast/archive/data/categ.30.html), Jun. 1991.

Product description for "Oil Change" located on the Internet at http://store.mcafee.com/product.asp?ProductID=28&CategoryID–12, pp. 1–2, Feb. 1999.

NetRanger 1.3 User's Guide, Copyright © 1997 by WheelGroup Corporation, NetRanger product first available summer of 1996, 1996.

"Information Security and Privacy in Network Environments," by U.S. Office of Technology Assessment, OTA–TCT–606 (Washington DC: US Government Printing Office), Sep. 1994.

"A Few Attacks on the Zero Knowledge State in Novell's Netware" by Greg Miller, pp. 1–11. (found at http://www.cs.purdue.edu/coast/archive/data/categ30.html), Jul. 30, 1996.

"Introduction to Algorithms," by Thomas H. Cormen, Charles E. Leiserson, Ronald L. Rivest, Chap. 34, pp. 853–885, Copyright ©1990, 1990.

* cited by examiner

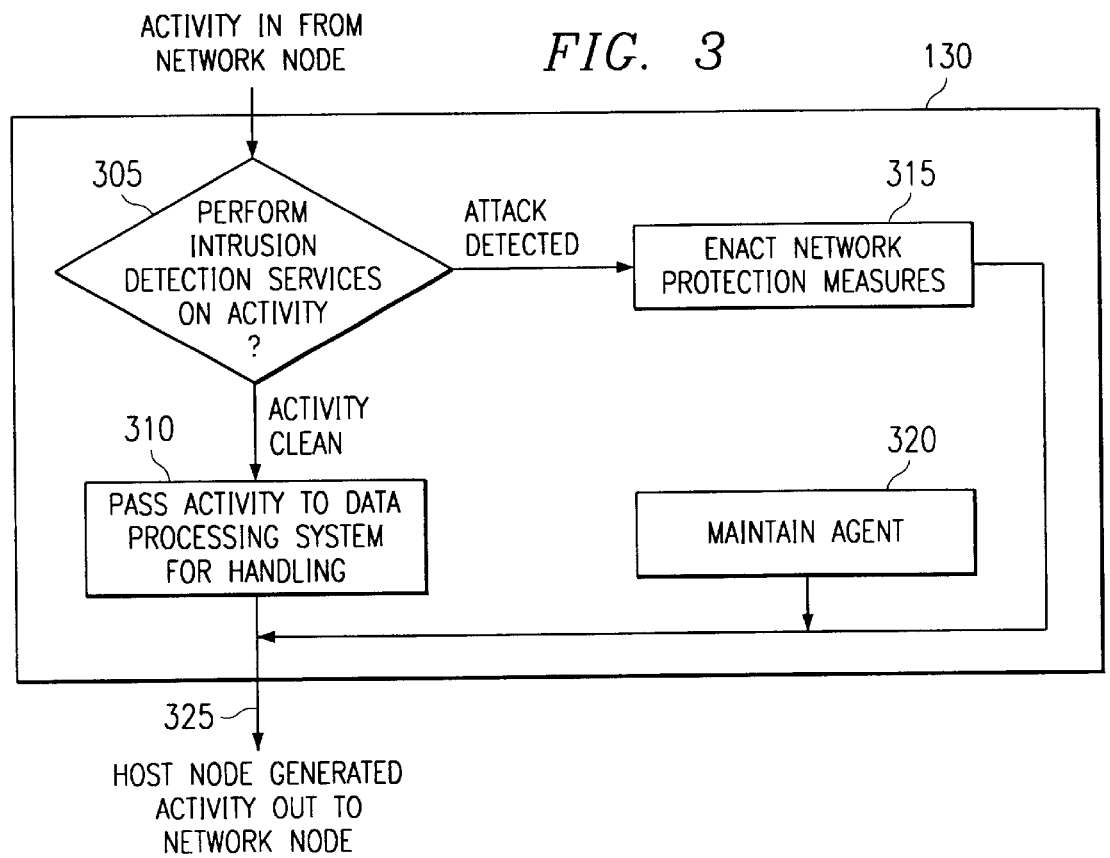
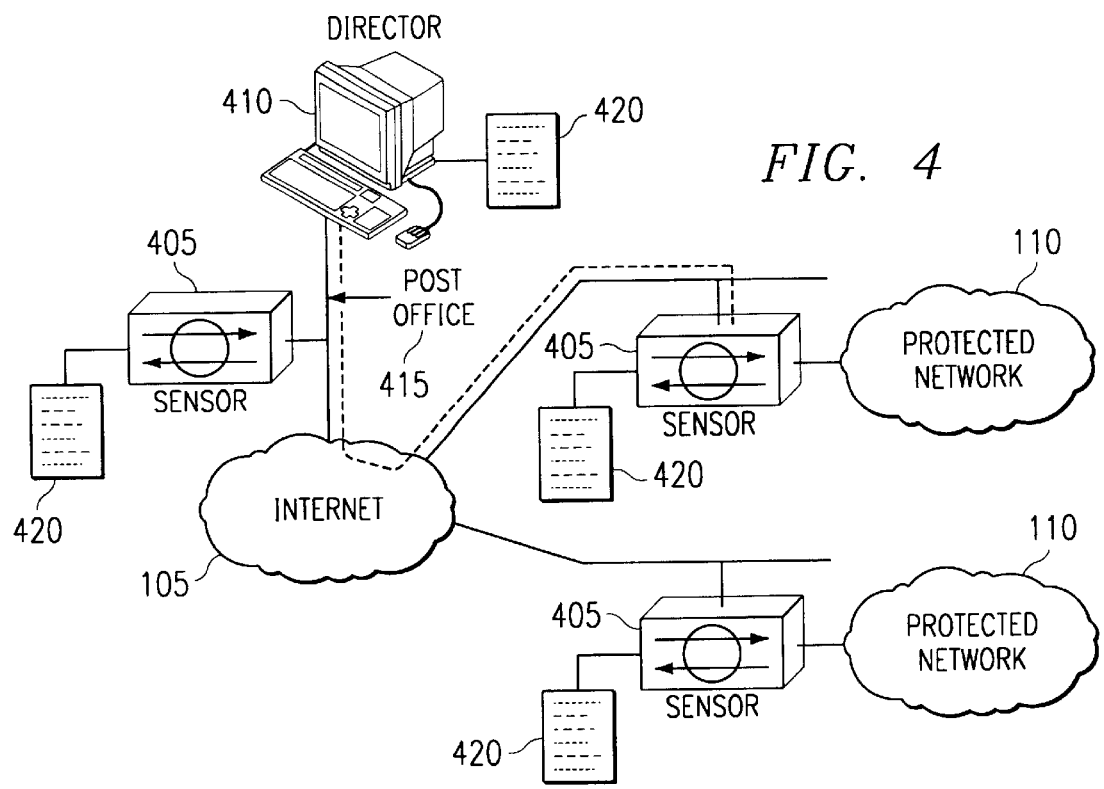

MULTILAYERED INTRUSION DETECTION SYSTEM AND METHOD

FIELD OF THE INVENTION

The present invention relates generally to intrusion detection systems and, more particularly, to a multilayered intrusion detection system and method.

BACKGROUND OF THE INVENTION

Intrusion Detection was developed to extend security visibility into the network and monitor the activity of users while they are on the network. An Intrusion Detection System/Service (IDS) can augment an end-to-end security solution as a dynamic security component by detecting, responding to, and reporting unauthorized activity from data derived directly from the network.

Network intrusion detection is a process that can identify and respond to misuse or policy violations on a network. By placing sensing enabled devices at determined points on,the network, network traffic can be monitored and compared against patterns or "signatures" that represent suspicious activity, misuse, or actual attacks. These devices can send alerts to the security management system and, under appropriate circumstances, send commands directly to network equipment such as routers and firewalls, reconfiguring them to deny access to the attacker. The system can automatically and quickly responds in a user-defined manner to send an alert or take immediate action.

Host-based intrusion detection monitors activity on a single system while network-based intrusion detection monitors all activity over a given network connection or segment. Host-based intrusion detection systems can be used to protect critical network servers or other individual systems containing sensitive information. The implementation of these systems is typically in the form of small clients or applications. Intrusions can be detected by analyzing operating system audit trails, application audit trails, and other system activity.

Network-based intrusion detection systems can be used to monitor activity on a specific network segment. Where a host-based intrusion detection system resides on a workstation and shares a CPU (central processing unit) with other user applications, a network-based solution is typically a dedicated platform. Conventional network-based intrusion detection systems can perform rule-based or expert system analysis of traffic using parameters set up by the security manager, and the signatures, which flag suspicious or attack activity. The systems can analyze network packet headers to make security decisions based on source, destination, and packet type. They can also analyze packet data to make decisions based on the actual data being transmitted. These systems scale well for network protection because the number of actual workstations, servers or user systems on the network is not critical. It is the amount of traffic which determines performance. In addition, sensing devices placed around the globe can be configured to report back to a central site, enabling a small team of security experts to support a large enterprise.

There are a variety of technical disadvantages associated with the aforementioned types of Intrusion Detection System/Service (IDS). For example, a host-based IDS cannot detect network wide intrusion attempts. Additionally, host-based systems require the use of a host server's system resources such as disk space, RAM (random access memory), and CPU (central processing unit) time, and, as such, it impacts system performance. Host-based intrusion detection systems are ideal if a limited number of critical servers must be protected, however, they do not scale well if enterprise-wide solutions are needed. Alternatively, a network-based IDS might not have the processing power to detect all intrusion attempts on individual hosts.

In addition to the technical disadvantages observed by employing the above types of IDS, a series of other technical disadvantages exist in current IDS technology. As network bandwidth continues to increase, IDS's are falling behind. It is possible that even if the IDS identifies an attack in a packet, a receiving host may have accepted the packet before the IDS has had an opportunity to act upon it. Additional technical disadvantages which occur from utilizing a network-based IDS include wasted processing resulting from the network-based IDS processing traffic which the host will discard without using as well as the network-based IDS's inability to process encrypted traffic.

SUMMARY OF THE INVENTION

In accordance with the teachings of the present invention, a multilayered intrusion detection system and method is provided.

In one aspect, the present invention provides an intrusion detection method which maintains at least one registry indicating at least one host node capable of performing host-based intrusion detection services. The method also includes monitoring activity on a network and comparing at least one characteristic of the monitored activity with at least one host node in the registry. The network activity is dismissed when the monitored activity has at least one characteristic in common with at least one host node in the registry.

Another aspect of the present invention provides an intrusion detection method which includes monitoring activity on a network and maintains a registry of each host node address associated with a host node operable to perform host-based intrusion detection services. The method includes comparing a destination address of the monitored network activity with at least one host node address in the registry and dismissing the network activity having a destination address in common with at least one host node address in the registry. Intrusion detection services are performed on the network activity not dismissed to a registered host node by any of a plurality of network nodes and on the dismissed network activity using the host-based intrusion detection service operable on the host node receiving the dismissed network activity.

In yet another aspect, the present invention provides a computer system for use as an intrusion detection system including at least one processor and at least one computer readable medium communicatively coupled to the processor. A registry is stored on the computer readable medium, the registry operable to maintain entries indicative of at least one host node operable to perform intrusion detection services. The computer system is operable to dismiss network activity having a destination address indicative of at least one entry in the registry.

Another aspect of the present invention provides an intrusion detection system including at least one host node and at least one network node communicatively coupled to the host node including at least one processor and at least one computer readable medium communicatively coupled to the processor. A registry is stored on the computer readable medium, the registry operable to maintain entries indicative of at least one host node operable to perform intrusion detection services. The network node is operable to dismiss network activity having a destination address indicative of at least one host node entry in the registry.

In yet another aspect, the present invention provides a computer readable medium comprising at least one program operable to maintain at least one registry. The program is also operable to compare at least one characteristic of monitored network activity to at least one characteristic of the registry and to dismiss monitored network activity having at least one characteristic in common with at least one characteristic of the registry.

One technical advantage provided by the present invention is its ability to reduce the intrusion detection duties performed by network servers or other network appliances by performing intrusion detection duties at appropriately enabled hosts.

Another technical advantage provided by the present invention is its ability to perform intrusion detection monitoring on encrypted network traffic.

Yet another technical advantage provided by the present invention lies in its ability to prevent intruders, undetected by network intrusion detection services, from intruding host devices on the network by performing intrusion detection services at each registered host node.

An additional technical advantage provided by the present invention is its ability to allow a network intrusion detection system to perform primarily network-wide intrusion detection by enlisting hosts to perform host-based intrusion detection services.

Another technical advantage provided by the present invention is its ability to perform intrusion detection services on networks with more traffic than previously possible by sharing intrusion detection duties amongst network nodes and host nodes.

Another technical advantage provided by the present invention is its ability to provide comprehensive intrusion detection services on networks using tunneling services such as those utilized in virtual private networks (VPN).

BRIEF DESCRIPTION OF THE DRAWINGS

For a more complete understanding of the present invention, and the advantages thereof, reference is now made to the following written description taken in conjunction with the accompanying drawings, in which:

FIG. 3 illustrates a method performed by a host node according to an embodiment of the present invention;

FIG. 4 illustrates an embodiment of a network node configuration according to the present invention.

DETAILED DESCRIPTION OF A PREFERRED EMBODIMENT

Figure 1:
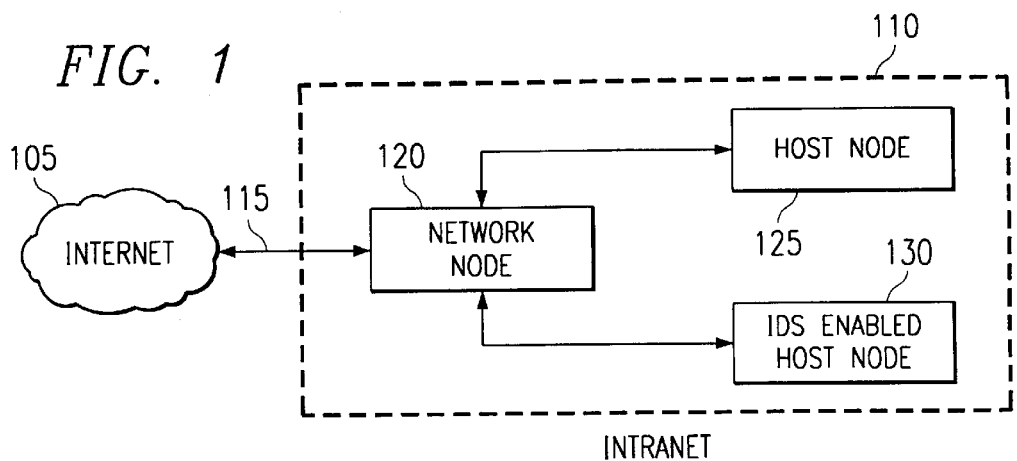
FIG. 1 illustrates a block diagram of a network according to an embodiment of the present invention.

Referring now to FIG. 1, a block diagram of a network according to an embodiment of the present invention is illustrated. As illustrated in FIG. 1, Internet 105 is communicatively coupled to Intranet 110 via two-way communication medium 115. A standard set of components which might be included in Intranet 110 includes network node 120, host node 125 and Intrusion Detection Service (IDS) enabled host node 130. Alternative embodiments of the network configuration illustrated in FIG. 1 might include two or more Intranets communicatively coupled together, as well as the addition of firewalls or other network appliances such as routers in either Intranet 110 or Internet 105. Additionally, network node 120 can be any device, such as a server, having processing power and the ability to transmit and receive network activity. Host node 125 and IDS enabled host node 130, like network node 120, are network components having processing power and network communication capabilities. Host nodes 120 and 130 can be servers or personal computers, as well as network appliances such as routers.

Figure 2:
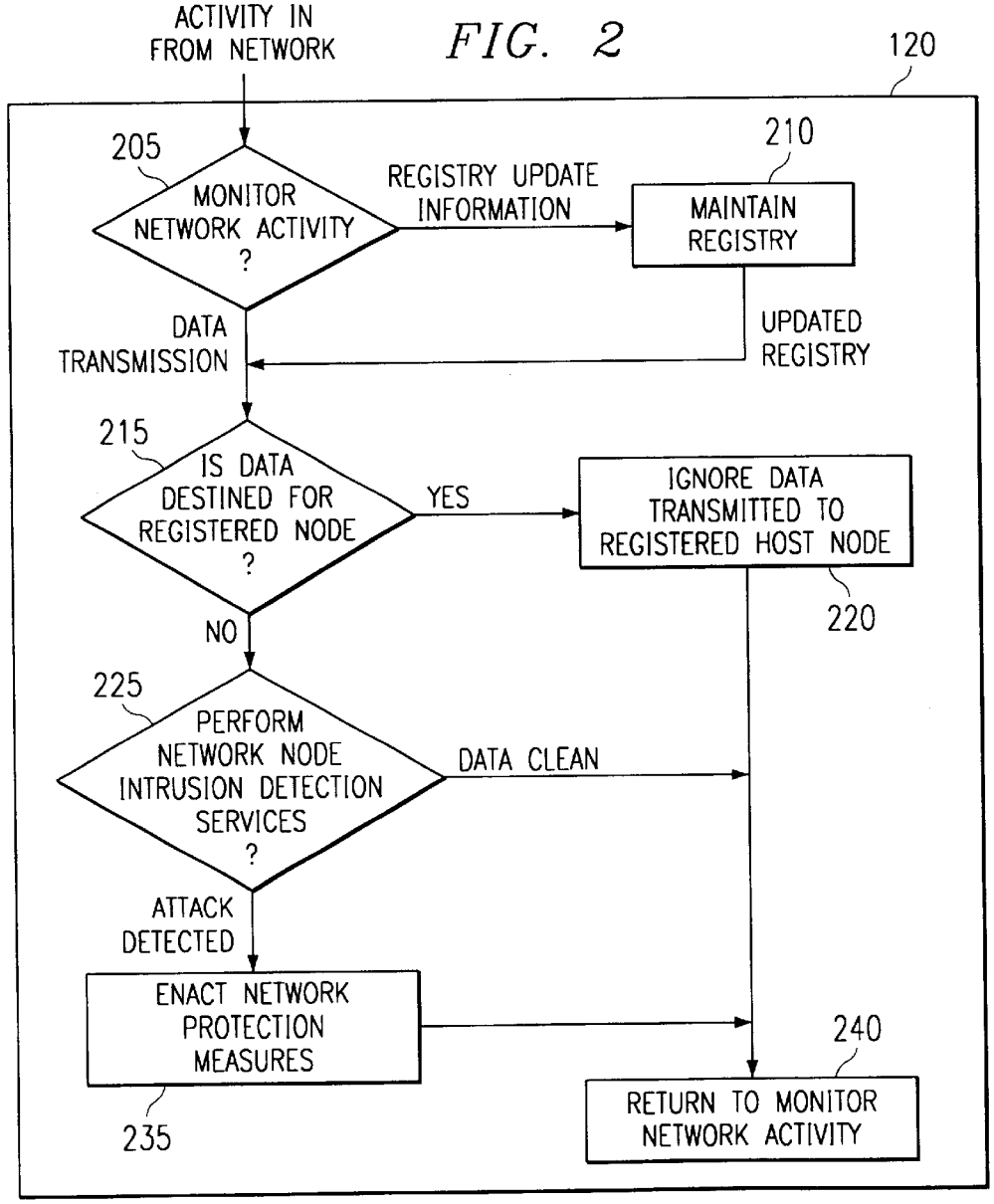
FIG. 2 illustrates a block diagram of a method performed by a network node according to an embodiment of the present invention.

Referring now to FIG. 2, an illustration of a block diagram of a method performed by a network node according to an embodiment of the present invention is shown. The present invention achieves its many advantages, in part, by maintaining a registry of host nodes capable of performing intrusion detection services. The present invention begins its methodology implemented in network node 120 by monitoring network activity on the network segment to which network node 120 is attached as indicated at step 205. At step 205, network activity is monitored by performing a series of inquiries on the network activity received by network node 120. At step 205, network activity is monitored to determine whether the network activity is a data transmission or if the network activity is registry information intended to update the registry maintained by network node 120. As a result of this determination, the method of FIG. 2 proceeds either to step 210 for registry maintenance or to step 215 for data transmission processing.

In the situation where it is determined that the network activity is registry information intended to update the registry maintained by network node 120, the network activity or registry information is passed to step 210 for registry maintenance. Upon receipt of the registry information from step 205, maintenance of the registry is performed at step 210. The registry maintained by network node 120 includes entries indicative of host nodes registered as being able to perform intrusion detection services. These entries can include such indicators as the IP (Internet Protocol) address of each registered node, the MAC (media access control) address of each node, the network card address of each node, or any other information which can distinguish one node from another node.

Routine registry maintenance procedures might include first verifying whether or not the node entry to be updated currently exists or not. For example, if the registry update information is intended to add a node to the registry, a determination whether or not the node entry already existed in the registry would be performed at step 210. At step 210, if an entry exists, the registry update information is compared to the existing entry and the existing entry is updated accordingly. If it was determined that entry for the node to be added did not previously exist, a new entry containing all of the appropriate information indicative of the node to be added would be created.

In the situation where the registry update information is intended to delete or disable a node from the registry, verification of the existence of an entry indicative of the node is performed at step 210. If an entry is not found, the registry update information can be discarded or other measures can be taken. If an entry for the node to be disabled is found at step 210, the entry would then be disabled or deleted and the registry updated to reflect the node as no longer being able to perform intrusion detection services.

Upon completion of the processing associated with the registry update information, an updated registry is made available to network node 120 for the data transmission processing performed at step 215.

As mentioned above, one possible determination which can be made at step 205 is that the network activity monitored by network node 120 is a data transmission. If this determination is made at step 205, the characteristics of the data transmission are passed on to step 215.

At step 215, characteristics of the data transmission are compared against the entries in the registry maintained by the network node 120. In order for the network to be protected from potential dangers, measures are taken at step 215 to ensure that the data transmission can be trusted. At step 215, the data transmission is evaluated to determine whether or not the data transmission is destined for a registered host node. This determination can be performed by reading the destination address contained in the packets which make up the network activity or data transmission and comparing that address with the addresses of the host nodes in the registry, as well as by other means. If the data transmission is determined to be destined for a registered host node or host nodes, the method of FIG. 2 proceeds to step 220. At step 220, the data transmission is dismissed and allowed to proceed unencumbered to each registered host node for which it was intended. If it is determined at step 215 that the data transmission is not destined for a registered host node, such as network activity destined for host node 125, the data transmission is halted for processing at step 225.

At step 225, intrusion detection services are performed on the data transmission. These intrusion detection services can be performed either by host-based intrusion detection services available on the network node 120 or by network-based intrusion detection services available on network node 120. Additionally, the data transmission may be passed by network node 120, to another node, host or network, having the ability to perform intrusion detections services on the data transmission.

When the network activity is processed at step 225 of FIG. 2, it looks for patterns of misuse. Patterns can be as simple as an attempt to access a specific port on a specific host, or as complex as sequences of operations distributed across multiple hosts over an arbitrary period of time. The first type of pattern is termed an atomic pattern; the second, a composite pattern.

At step 225, searches for patterns of misuse are performed by examining either the data portion or the header portion of network packets. Content-based attacks derive from the data portion, and context-based attacks derive from the header portion.

Another methodology for intrusion detection services includes a "three-tier" attack detection capability. Examples include: Named attacks - - - Single attacks that have specific names or common identities, Smurf, PHF, Land, General Category attacks - - - Attacks that keep appearing in new variations with the same basic methodology, Impossible IP Packet, IP fragmentation, Extraordinary attacks - - - Extremely complicated or multi-faceted attacks, TCP hijacking, and E-mail spam.

Such a detection methodology allows for the detection General Category attacks on-the-fly even as hackers launch new variations in an attempt to fool security systems. For example, there are now many variations of the original named "Land" attack which are all variations of the general category "Impossible IP Packet." So even as more variations evolve, over time the general category signature will detect them.

The results of the intrusion detection services performed at step 225 typically come in one of two forms. If no intrusion attempt is detected by the intrusion detection services, the method of FIG. 2 proceeds to step 240. If, at step 225, an attempt at network intrusion is detected, step 235 begins enacting network protection measures. Network protection measures can include sounding an alarm, denying access, creating a log, as well as other measures. Network protection will be discussed in greater detail below.

Once a data transmission has been allowed to proceed to an intrusion detection service enabled host node at step 220, once data has been determined to be clean by step 225 or once network protection measures have been enacted by step 235, the method of FIG. 2 returns to step 205 to continue network activity monitoring. Additional method steps as well as methods can be included in the processes performed by network node 120 without departing form the spirit and scope of the present invention.

Referring now to FIG. 3, a method performed by a host node according to an embodiment of the present invention is illustrated. The method of processing performed in an intrusion detection service enabled host node begins at step 305 upon receipt of the data transmission dismissed by network node 120. In order to reduce the overhead at the network nodes 120, host node 130 is enabled to perform intrusion detection services on the network activity it receives. Upon dismissal of network activity by network node 120, intrusion detection services enabled host node 130 performs intrusion detection services on the network activity it receives.

At step 305, host node 130 performs intrusion detection services, preferably host-based, to determine whether or not the network activity includes a network intrusion attempt. Once the intrusion detection services of host node 130 have been performed, clean activity is passed on to step 310 for processing by the data processing system incorporated into host node 130. Data processing functions might include e-mail capabilities, word processing, and other applications operable on a host node 130. If step 305 determines that the network activity includes a network intrusion attempt, the method of host node 130 proceeds to step 315 to enact network security protection measures. As mentioned above, network security measures can include sounding an alarm, changing the configurations on firewalls and routers, denying access, as well as other measures. Network security measures will be discussed in greater detail below.

As mentioned above, when network intrusion detection services are performed on network activity, patterns of misuse are searched for. Patterns can be as simple as an attempt to access a specific port on a specific host, or as complex as sequences of operations distributed across multiple hosts over an arbitrary period of time. The first type of pattern is termed an atomic pattern; the second, a composite pattern.

These searches for patterns of misuse are performed by examining either the data portion or the header portion of network packets are performed. Content-based attacks derive from the data portion, and context-based attacks derive from the header portion.

Another methodology for intrusion detection services includes a "three-tier" attack detection capability. Examples include: Named attacks - - - Single attacks that have specific names or common identities, Smurf, PHF, Land, General Category attacks - - - Attacks that keep appearing in new variations with the same basic methodology, Impossible IP Packet, IP fragmentation, Extraordinary attacks - - - Extremely complicated or multi-faceted attacks, TCP hijacking, and E-mail spam.

Such a detection methodology allows for the detection General Category attacks on-the-fly even as hackers launch new variations in an attempt to fool security systems. For example, there are now many variations of the original named "Land" attack which are all variations of the general category "Impossible IP Packet." So even as more variations evolve, over time the general category signature will detect them.

Maintained on host node 130 is an agent, configured to perform a variety of functions for host node 130 as indicated at step 320. One function performed by the agent is to register the host node with the registry as being capable of performing intrusion detection services. The agent sends host node 130 information to network node 120 indicating the various information components required by network node 120 to create an entry indicative of host node 130. The agent can also be enabled to perform automated service updates to the host node on which it is maintained. For example, if the intrusion detection service operating on host node 130 needs to be updated to detect new versions of intrusion attempts, step 320 requests and manages the updates for host node 130 without requiring interaction form a host node user. The agent maintained at step 320 can also be configured to update other software applications resident on host node 130, as well as other characteristics of host node 130.

Activity generated as a result of enacting network protection measures at step 315, data processing activities at step 310 and agent actions at step 320 are placed on the network for transmission to network node 130 as indicated at 325.

Referring now to FIG. 4, an embodiment of a network node configuration according to the present invention is illustrated. An IDS can be implemented as a real-time intrusion detection system that includes sensors 405, stealthy security appliances that act as "sniffers," and a director 410, a centralized management console. Director 410 can be configured to collect incoming sensor 405 data, translate it, and present it to security personnel in a map-based and intuitive graphical interface. Users can quickly access additional information about the type of attack from a Director's Network Security Database (NSDB). Director 410 can also be configured to allow security personnel to manage the configuration of remote sensors 405.

Each sensor 405 is positioned such that each can monitor network activity from host nodes 130 contained on segments of Intranet 110 and Internet 105. As the present invention teaches, when sensor 405 monitors this activity, it is checking to see if the network activity is destined for an intrusion detection enabled host node 130. The registry 420 sensor 405 uses to determine whether the destination address of network activity is indicative of a registered host node 130 can reside on sensor 405, on director 410 or be otherwise accessible by sensor 405. Post office 415 can be utilized by sensor 405 to communicate with an appropriate registry 420.

As illustrated, it is possible that each network segment monitored has a dedicated sensor 405, including the Internet, Intranet, and Extranet. The sensor 405 appliance of the present invention is optimized for specific data rates and interfaces, such as Ethernet (10BaseT), Fast Ethernet (100BaseT), Token Ring (4 and 16 Mbps), and Fiber Distributed Data Interface (FDDI) (Single or Dual mode) as well as others. Sensors 405 can be configured to use an expert rules-based system engine to distill large volumes of network activity into meaningful security events. In this scenario, it is possible that each sensor 405 have a local registry 420 indicative of host nodes located on each respective network segment to which each sensor 405 is coupled.

Post Office 415 is a communications architecture configured to provide communications between the sensors 405 and directors 410. Communication is supported by a connectionless-based protocol that can switch between alternate routes to maintain point-to-point connections allowing, at least in part, for at least one copy of a registry 420 to always be accessible.

The high performance of sensor 405 and the sharing of intrusion detection services with host nodes 130 allows sensor 405 to monitor nearly every packet on a network segment. Therefore, it is not required to create profiles and omit signatures, or create other IDS exceptions which entail constant and extraordinary knowledge of a network to ensure that the correct attack signatures are enabled.

As mentioned earlier, after an attack is detected network security measures can be generated by sensor 405 which can respond to an attack in the following user-configurable ways: Generate an alarm—alarms are generated by sensor 405, and are typically routed to one or more remote director 410. Log the alarm event—all sensor log data is written to flat files, which are either event logs or IP session logs. Record the session to an IP session log to either gather evidence of an unlawful activity or to record an intruder's knowledge of the network. This capability is commonly used in conjunction with a "fishbowl" or "honeypot" technique where an intruder is vectored into a "safe" network or server that impersonates important applications or information. Other security measures are anticipated by the present invention.

Figure 5:
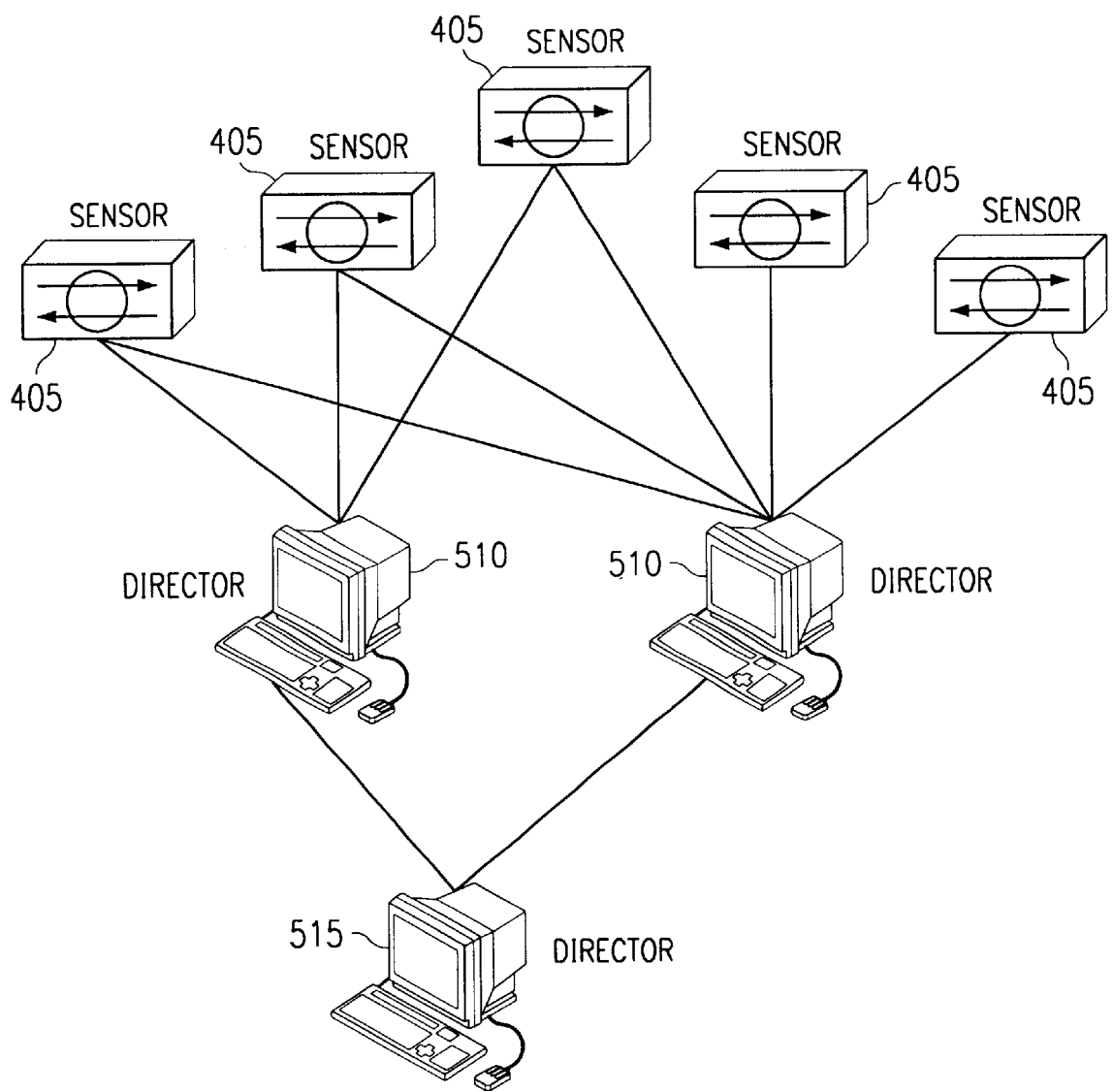
FIG. 5 illustrates a network node hierarchy according to the present invention.

Referring now to FIG. 5, a network node hierarchy according to the present invention is illustrated. The alternate embodiment of a network node depicted in FIG. 5 illustrates another feature of the director/sensor network node configuration and its ability to build hierarchies of sensor 405 and director 510 and 515 systems through the use of message propagation. Instead of broadcasting events from a sensor onto multiple devices, information can be sent to a single director 510 or 515, which can then propagate packets onto other platforms defined by local configuration files. Likewise, a single registry can be maintained by director 510 and 515 which is accessible, via post office 415, by all sensors 405 coupled to the network. Sensors 405 can propagate messages to more than one director 510 and 515, thereby ensuring fault-tolerant communication.

FIG. 5 illustrates this concept through a simple hierarchy of directors 510 and 515. In addition to providing performance benefits and fault tolerance of both communications and registry verifications/usage, distribution hierarchies can simplify system management. For example, local director 510 might be responsible for monitoring from 9 A.M. to 5 P.M. and then transfer control onto a central director 515 every evening.

Although the present invention and its advantages have been described in detail it should be understood that various changes, substitutions, and alterations can be made hereto without departing from the spirit and scope of the invention as defined by the following claims.

What is claimed is:

1. An intrusion detection method comprising:
   maintaining at least one registry indicating at least one host node capable of performing intrusion detection services, the registry operable to distinguish the host node from any other host node;
   monitoring activity on a network;

comparing at least one characteristic of the monitored activity with the registry;

determining based on the comparison whether the monitored activity has the characteristic in common with any of the host nodes in the registry; and dismissing the monitored activity having at least one characteristic in common with at least one host node in the registry.

2. The method of claim 1 further comprising comparing at least one destination address of the monitored activity with the registry of host nodes.

3. The method of claim 1 further comprising maintaining an agent on the host node configured to register the host node in the registry.

4. The method of claim 3 further comprising enabling the agent to update services available to the host node.

5. The method of claim 1 further comprising performing intrusion detection services on the dismissed monitored activity received by a host node.

6. The method of claim 1 further comprising performing intrusion detection services on monitored activity not dismissed.

7. The method of claim 6 wherein the intrusion detection services are performed by a network intrusion detection system.

8. The method of claim 1 further comprising monitoring network activity on a tunneling network.

9. An intrusion detection method comprising:

monitoring activity on a network;

maintaining a registry of each host node address associated with a host node operable to perform host-based intrusion detection services, the each host node address operable to distinguish the host node from another host node;

comparing a destination address of the network activity with at least one host node address in the registry;

determining based on the comparison whether the monitored activity has the destination address in common with any of the host node addresses;

dismissing the network activity having a destination address in common with at least one host node address in the registry to the host node;

performing intrusion detection services on the network activity not dismissed to a registered host node; and performing intrusion detection services on the dismissed network activity using the host-based intrusion detection service operable on the host node receiving the dismissed network activity.

10. The method of claim 9 further comprising maintaining at least one agent, by each host node indicated in the registry, operable to perform host node registration.

11. The method of claim 10 further comprising enabling the agent to update characteristics associated with the host node.

12. The method of claim 9 further comprising performing network-based intrusion detection services on the network activity not dismissed to a registered host node.

13. A computer system for use as an intrusion detection system comprising:

at least one processor;

at least one computer readable medium communicatively coupled to the processor;

a registry stored on the computer readable medium, the registry operable to maintain entries indicative of at least one host node operable to perform intrusion detection services, the registry further operable to distinguish the host node from another host node; and wherein the computer system is operable to compare a characteristic of network activity to the registry, to determine whether the network activity has the characteristic in common with any of the host nodes in the registry based on the comparison, and to dismiss network activity having a destination address indicative of at least one entry in the registry.

14. The system of claim 13 further comprising:

at least one host node communicatively coupled to the computer system including at least one processor; at least one computer readable medium communicatively coupled to the processor; at least one agent stored on the computer readable medium, operable to register the host node with the registry; and wherein the at least one host node is operable to perform intrusion detection services.

15. The system of claim 14 wherein the at least one agent is further operable to update services available to the host node.

16. The system of claim 13 wherein the computer system is further operable to monitor network activity.

17. The system of claim 13 wherein the computer system is further operable to compare a destination address of the network activity with at least one entry in the registry.

18. The system of claim 13 wherein the computer system is further operable to perform network-based intrusion detection services.

19. The system of claim 13 wherein the computer system is further includes: at least one sensor; and at least one director.

20. The system of claim 19 wherein the computer system further includes at least one post office operable to enable communication between at least the sensor and the director.

21. An intrusion detection system comprising:

at least one host node;

at least one network node communicatively coupled to the host node including at least one processor;

at least one computer readable medium communicatively coupled to the processor;

a registry stored on the computer readable medium, the registry operable to maintain entries indicative of at least one host node operable to perform intrusion detection services, the registry further operable to distinguish the host node from another host node; and wherein the network node is operable to compare a destination address of network activity to the registry, to determine whether the network activity has the destination address in common with any of the entries in the registry based on the comparison, and to dismiss network activity having a destination address indicative of at least one entry in the registry.

22. An apparatus comprising:

a computer readable medium comprising at least one program operable, when executed on a processor, to:

maintain at least one registry indicating at least one host node capable of performing intrusion detection services, the registry operable to distinguish the host node from any other host node;

compare at least one characteristic of monitored network activity to at least one characteristic of the registry;

determine based on the comparison whether the monitored activity has the characteristic in common with any of the host nodes in the registry; and dismiss monitored network activity having at least one characteristic in common with at least one characteristic of the registry.

23. A computer system for use as an intrusion detection system comprising:

a means for processing data;

a means for storing data, the means for storing data communicatively coupled to the means for processing data;

a means for maintaining entries indicative of at least one host node operable to perform intrusion detection services, the means for maintaining entries stored in the means for storing data, the entries operable to distinguish the host node from any other host node;

a means for determining based on the comparison whether the monitored activity has the characteristic in common with any of the host nodes in the registry; and a means for dismissing network activity having a destination address indicative of at least one entry in the means for maintaining entries.

* * * * *